United States Patent
Foss et al.

(10) Patent No.: US 7,353,119 B2
(45) Date of Patent: Apr. 1, 2008

(54) REDUCED NOISE SENSITIVITY IN MAGNETIC FLOWMETER

(75) Inventors: Scot R. Foss, Eden Prairie, MN (US); Kirk A. Hunter, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/375,168

(22) Filed: Mar. 14, 2006

(65) Prior Publication Data

US 2007/0225922 A1  Sep. 27, 2007

(51) Int. Cl.
G01F 1/00 (2006.01)
G06F 19/00 (2006.01)

(52) U.S. Cl. ........................................ 702/45
(58) Field of Classification Search ............... 702/45, 702/50, 55, 65, 100, 115, 189, 190; 73/861.1, 73/861.11, 861.12, 861.16
See application file for complete search history.

(56) References Cited

U.S. PATENT DOCUMENTS

| | | | | |
|---|---|---|---|---|
| 4,262,543 A * | 4/1981 | Grebe et al. | ............. | 73/861.17 |
| 4,309,909 A * | 1/1982 | Grebe et al. | ............. | 73/861.12 |
| 4,651,286 A | 3/1987 | Fukai et al. | | |
| 6,453,272 B1 * | 9/2002 | Slechta | ........................ | 702/190 |
| 6,505,517 B1 | 1/2003 | Eryurek et al. | ........... | 73/861.08 |
| 6,611,775 B1 | 8/2003 | Coursolle et al. | ............. | 702/65 |
| 6,615,149 B1 | 9/2003 | Wehrs | ........................ | 702/76 |
| 6,626,048 B1 | 9/2003 | Dam Es et al. | ........... | 73/861.13 |
| 6,853,928 B1 * | 2/2005 | Mitsutake | ..................... | 702/45 |

FOREIGN PATENT DOCUMENTS

| EP | 0 225 229 A1 | 10/1986 |
|---|---|---|
| WO | WO 2005/001395 | 1/2005 |

OTHER PUBLICATIONS

Wikipedia, the free encyclopedia, Non-linear filter, 1 page.*
Wikipedia, the free encyclopedia, Non-linear filter, 1 page, 2006.*
Central Station Steam Co. Cadillac® Magnetic Flow Meters, Model 8712C/U/H Magnetic Flowmeter Transmitters, 3 pages; no date.
"Notification of Transmittal of the International Search Report and the Written Opinion of the International Searching Authority, or the Declaration" for PCT/US2007/005802.

* cited by examiner

Primary Examiner—Bryan Bui
(74) Attorney, Agent, or Firm—Westman, Champlin & Kelly, P.A.

(57) ABSTRACT

A magnetic flowmeter for measuring flow of a process fluid includes a coil configured to apply a magnetic field to the process fluid. Electrodes are arranged to sense a fluid voltage signal related to the applied magnetic field and fluid flow. An analog to digital converter provides a digital output comprising a plurality of digital samples related to the sensed fluid voltage signal. Computation circuitry receives the digitized samples and responsively provides an output related to flow.

17 Claims, 8 Drawing Sheets

REDUCED NOISE SENSITIVITY IN MAGNETIC FLOWMETER

BACKGROUND OF THE INVENTION

The present invention relates to magnetic flowmeters that sense liquids flowing in industrial process plants. In particular, the present invention relates to noise detected by electrodes in such magnetic flowmeters.

Magnetic flowmeters utilize an electrically insulated flowtube that carries liquid flowing past an electromagnet and electrodes. The electrodes are carried in the flowtube and make electrical contact with the flowing liquid. The electrodes sense an electromotive force (EMF) which is magnetically induced in the liquid and which is proportional to flow rate of the fluid according to Faraday's law of electromagnetic induction.

Along with this flow EMF, undesired noise is often received from the electrodes of the magnetic flow tube. This electrical noise is indicative of undesired operating conditions associated with the flowing liquid such as poor liquid grounding connections, excessive electrical resistivity in the flowing liquid, particles in the liquid impacting the electrodes, ongoing dissolving of particles in the liquid, ongoing chemical reactions in the liquid, entrained gas bubbles and the like.

This "electrode noise" that originates in the liquid can give rise to measurement instability or variability in the flow output of the transmitter.

SUMMARY OF THE INVENTION

A magnetic flowmeter for measuring flow of a process fluid includes a coil configured to apply a magnetic field to the process fluid. Electrodes are arranged to sense a fluid voltage signal related to the applied magnetic field and fluid flow. An analog to digital converter provides a digital output comprising a plurality of digital samples related to the sensed fluid voltage signal. Computation circuitry receives the digitized samples and responsively provides an output related to flow.

DETAILED DESCRIPTION OF ILLUSTRATIVE EMBODIMENTS

A magnetic flowmeter and method are provided in which sensitivity to noise is reduced by inverting portions of a fluid voltage signal and/or filtering the fluid voltage signal in accordance with a non-linear filter.

Figure 1:
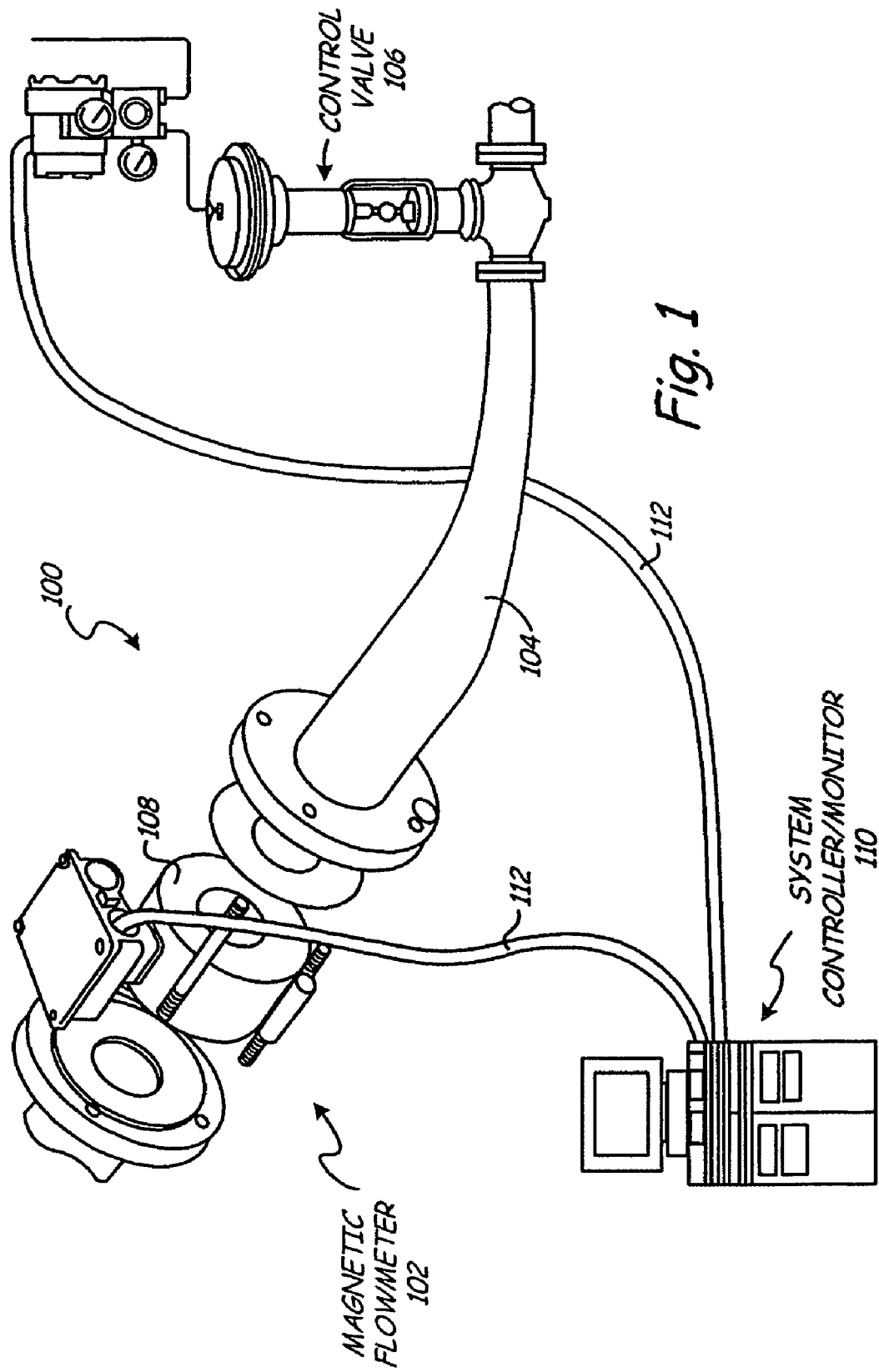
FIG. 1 is a diagram showing a process control system including a magnetic flow meter.

In FIG. 1, a typical environmental for magnetic flowmeter 102 is illustrated at 100. In FIG. 1, magnetic flowmeter 102 is shown coupled to process piping 104 which also couples to control valve 106. Magnetic flowmeter 102 is an example of one type of process variable transmitter which can be configured to monitor one or more process variables associated with fluids in a process plant such as slurries, liquids, vapors and gases in chemicals, pulp, petroleum, gas, pharmaceutical, food and other fluid processing plants. In a magnetic flowmeter, the monitored process variable relates to velocity of process fluid through flow tube 108. Magnetic flowmeter 102 outputs are configured for transmission over long distances to a controller or indicator via communication bus 112. In typical processing plants, communication bus 112 can be a 4-20 mA current loop, a fieldbus connection, a pulse output/frequency output, a HART protocol communication ethernet or a fiberoptic connection to a controller such as system controller/monitor 110. System controller 110 is programmed as a process monitor, to display flow information for a human operator or as a process controller to control the process using control valve 106 over communication bus 112.

Figure 2:
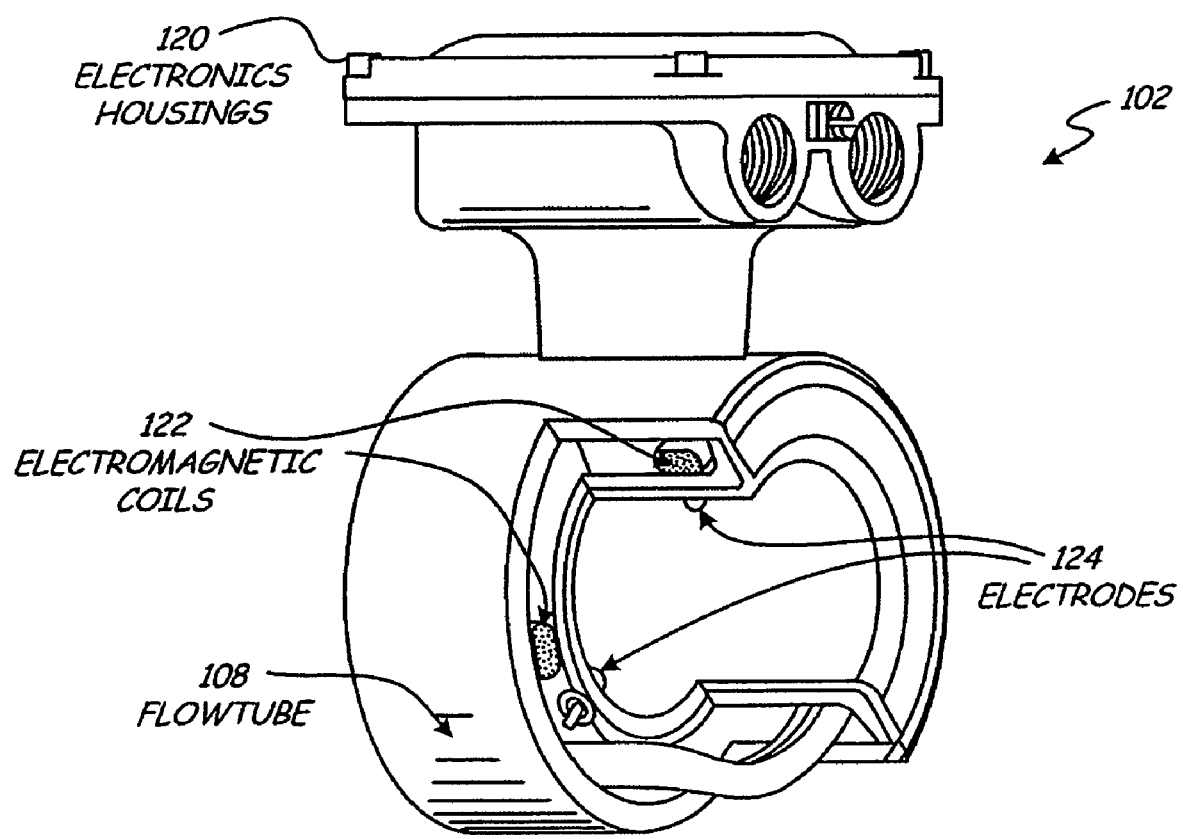
FIG. 2 is a partial cutaway view of the magnetic flow meter FIG. 1.

In FIG. 2, a perspective cutaway view of magnetic flowmeter 102 is shown generally. Flowmeter 102 includes electronics housing 120 connected to flow tube 108. Flow tube 108 includes electromagnetic coils 122 which are used to induce a magnetic field in fluid flowing through flow tube 108. The electrodes 124 in flow tube 108 provide an EMF sensor which senses the EMF generated in the fluid due to the velocity of the flow and the applied magnetic field and which are also sensitive to noise. Coil driver circuitry 130 (shown in FIG. 3) in electronic housing 120 provides a drive signal to electromagnetic coils 122 and electrodes 124 provide EMF output 134 to EMF signal amplifier 132 (also shown in FIG. 3).

Figure 3:
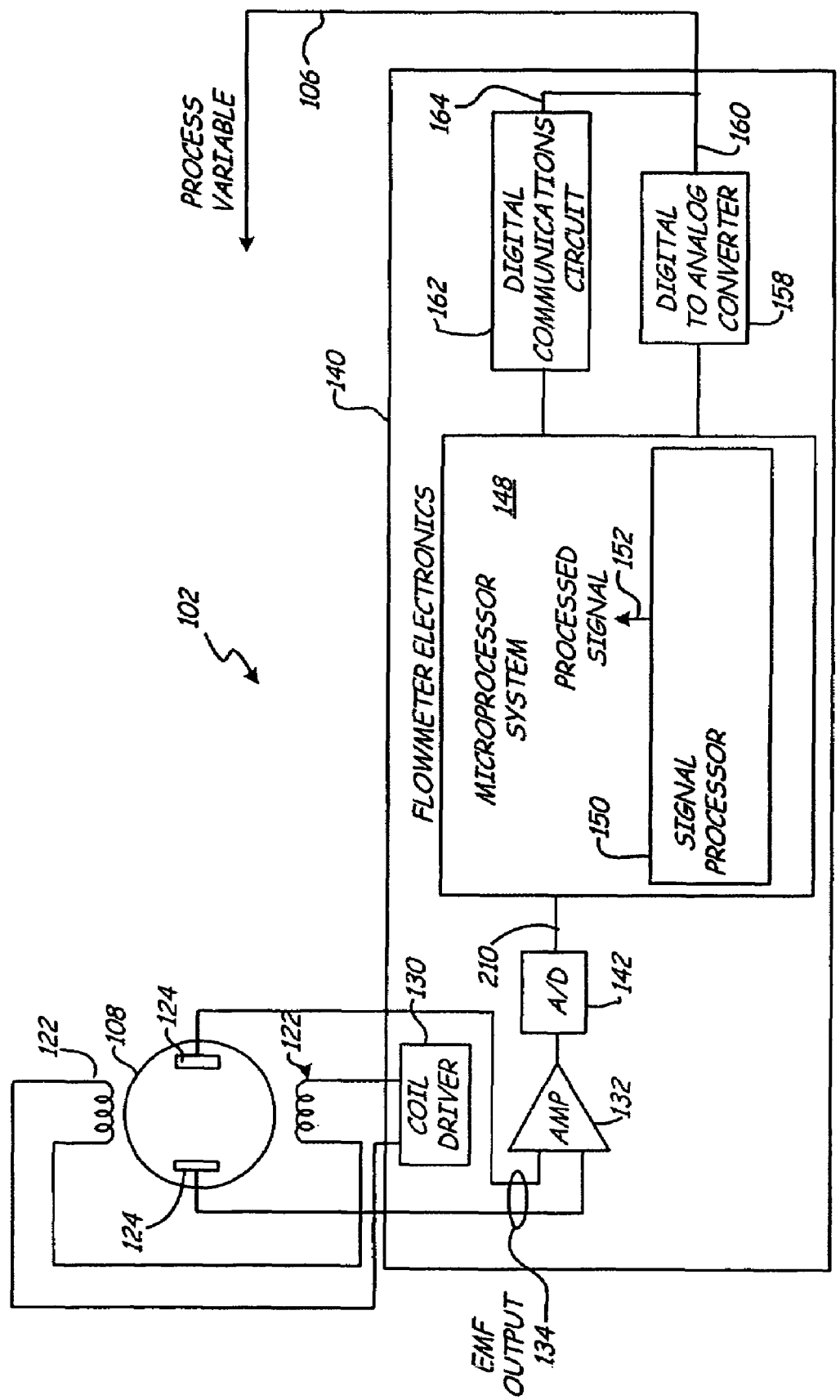
FIG. 3 is a simplified block diagram showing components of the magnetic flow meter FIG. 2.

In FIG. 3, a block diagram shows one embodiment of magnetic flowmeter 102 for measuring a flow of a conductive process fluid through flow tube assembly 108. Coils 122 are configured to apply an external magnetic field in the fluid flow in response to an applied drive current from coil driver 130. EMF sensors (electrodes) 124 electrically couple to the fluid flow and provide an EMF signal output 134 to amplifier 132 related to an EMF generated in the fluid flow due to the applied magnetic field, fluid velocity, and noise. Analog to digital converter 142 provides a digitized EMF signal to microprocessor system 148. A signal processor 150 is implemented in microprocessor system 148 of flowmeter electronics 140 which couples to the EMF output 134 to provide an output 152 related to fluid velocity.

Microprocessor system 148 calculates velocity through flow tube 108 in accordance with a relationship between the EMF output 134 and the flow velocity as set forth in Faraday's law, which states:

$$V = \frac{E}{kBD} \qquad \text{Eq. 1}$$

Where E can be the signal output 152 which is related to the EMF output 134, V is the velocity of the fluid, D is the diameter of flow tube 108 and B is the strength of the magnetic field in the fluid. k is a constant of proportionality. Microprocessor system 148 uses velocity to calculate flow of the process fluid in accordance with known techniques. A digital to analog converter 158 coupled to microprocessor system 148 generates an analog transmitter output 160 for coupling to communication bus 106. A digital communication circuit 162 generates a digital transmitter output 164. The analog output 160 and the digital output 164 can be coupled to process controllers or monitors as desired.

As discussed above, magnetic flowmeter 102 measures flow using the EMF signal induced in a conductive fluid. This EMF signal is at a relatively low level and is typically imbedded with very high levels of process noise. In order to improve the signal-to-noise ratio, coils of the flow meter are typically driven at very high levels, for example hundreds of milliamps of current, in order to generate magnetic fields which are large enough to produce electrode voltages that are measurable relative to the noise. Additionally, the coils are driven at relatively low frequencies due to the large time constant of the magnetic coils. At these low frequencies, the 1/f noise is considerable.

Figure 4:
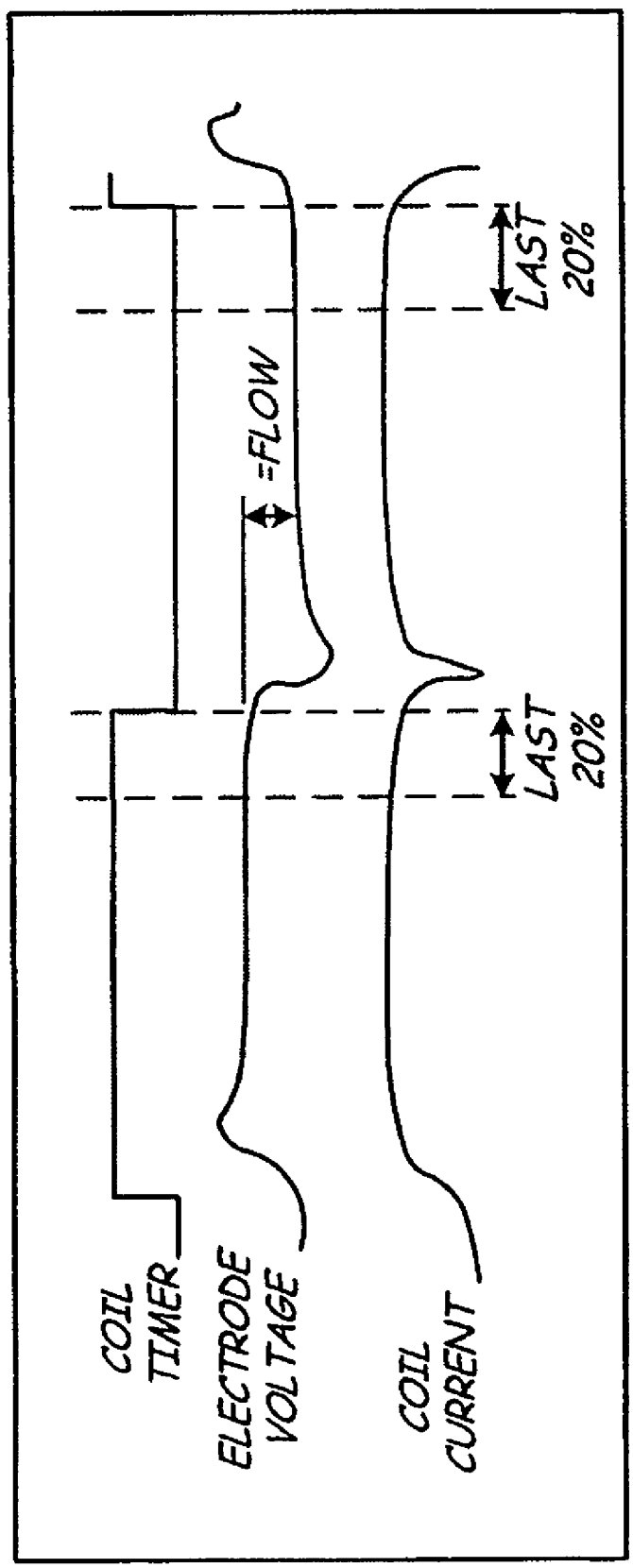
FIG. 4 is a graph showing coil timer, electrode voltage and coil current signals versus time for the magnetic flow meter.

FIG. 4 is a graph of a coil timer signal, electrode voltage and coil current versus time, for an example, flow meter. A pulse DC magnetic flow meter typically applies a square wave to the coils of the flow tube. The voltage is read from electrodes which are positioned 90 degrees relative to the coils. This voltage is proportioned to the flow of the conductive liquid in the flow tube. Typically, the electrode voltage is measured by taking the last 20% of each half of the square wave and then computing the difference between the two half cycles. The first part of each half cycle is ignored due to effects such as eddy currents and nulling spikes and to allow the coil current to settle due to the time constant of the coils.

Lock-in amplifiers can be used to detect and measure very small AC signals. They provide a DC output that is proportional to the RMS value of the AC signal. Lock-in amplifiers synchronously demodulate the input signal using a reference signal. They require a reference signal of the same frequency and phase as that of the input signal. This is usually accomplished by modulating the input signal from the same source as the reference signal. The lock-in amplifier will track any changes to the input frequency because the reference circuit is locked to the signal.

Figure 5:
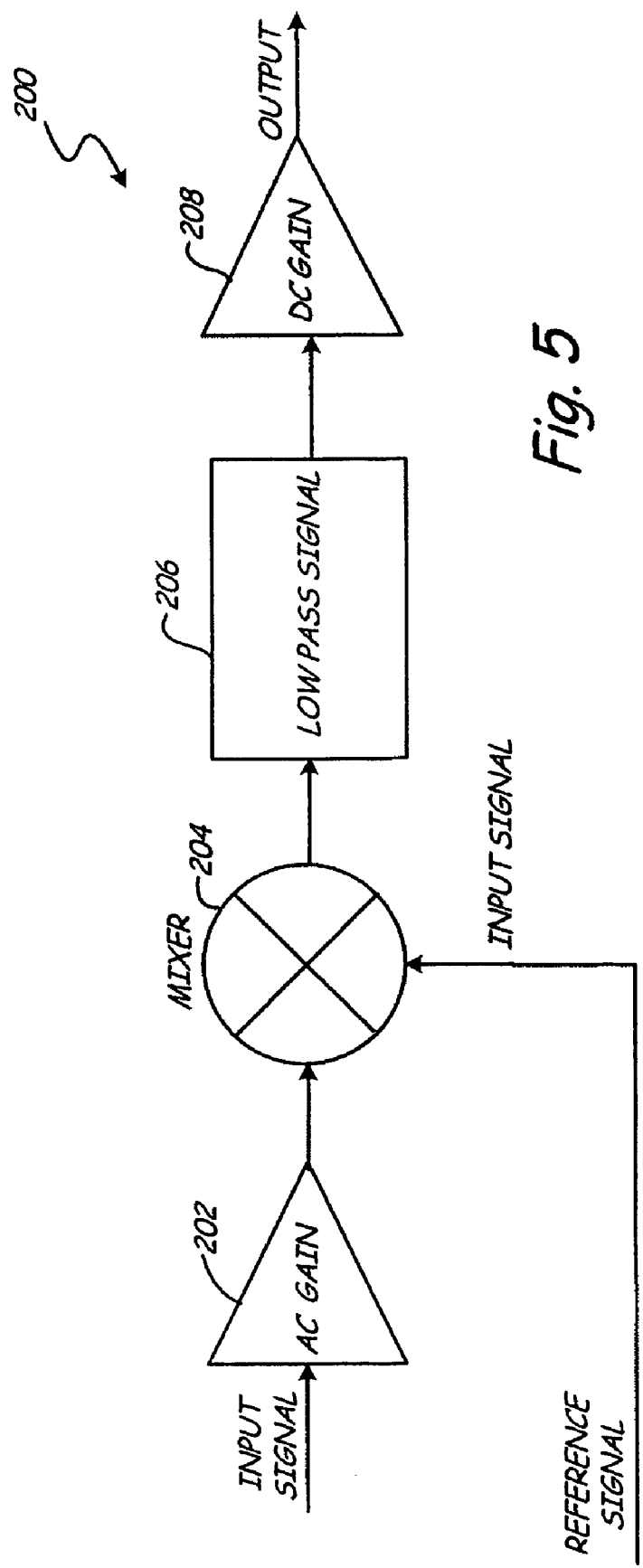
FIG. 5 is a simplified block diagram of a lock-in amplifier.

FIG. 5 is an example diagram of a lock-in amplifier 200 including an AC gain amplifier 202 which provides a signal to a mixer 204. Mixer 204 also receives a reference signal and provides an output to low pass filter 206. A DC gain amplifier 208 amplifies the output from low pass filter 206. The DC level is representative of the RMS value of the input signal that is in phase with the reference signal. Due to the tracking nature of lock-in amplifiers, extremely small bandwidths can be used to improve the signal-to-noise ratio. Because of this, lock-in amplifiers can give effective "Q" values which are in excess of 100 dB. In contrast, with a normal band pass filter, it is difficult to obtain a "Q" value greater than 50. As a result, noise signals at frequencies and phases other than the reference frequency are rejected and do not affect the measurement. Accurate measurements can be made even when a small signal is obscured by much larger noise sources.

Some or all of the components in FIG. 5 can be implemented in software using a digital signal processor and analog to digital converter or the like. An averaging filter, for example with a period of one coil cycle, can be used to prevent oscillations if the input is DC coupled. A software implementation provides a number of advantages over hardware implementations of lock-in amplifiers including enhanced configurability and more advanced filtering functions.

Figure 6:
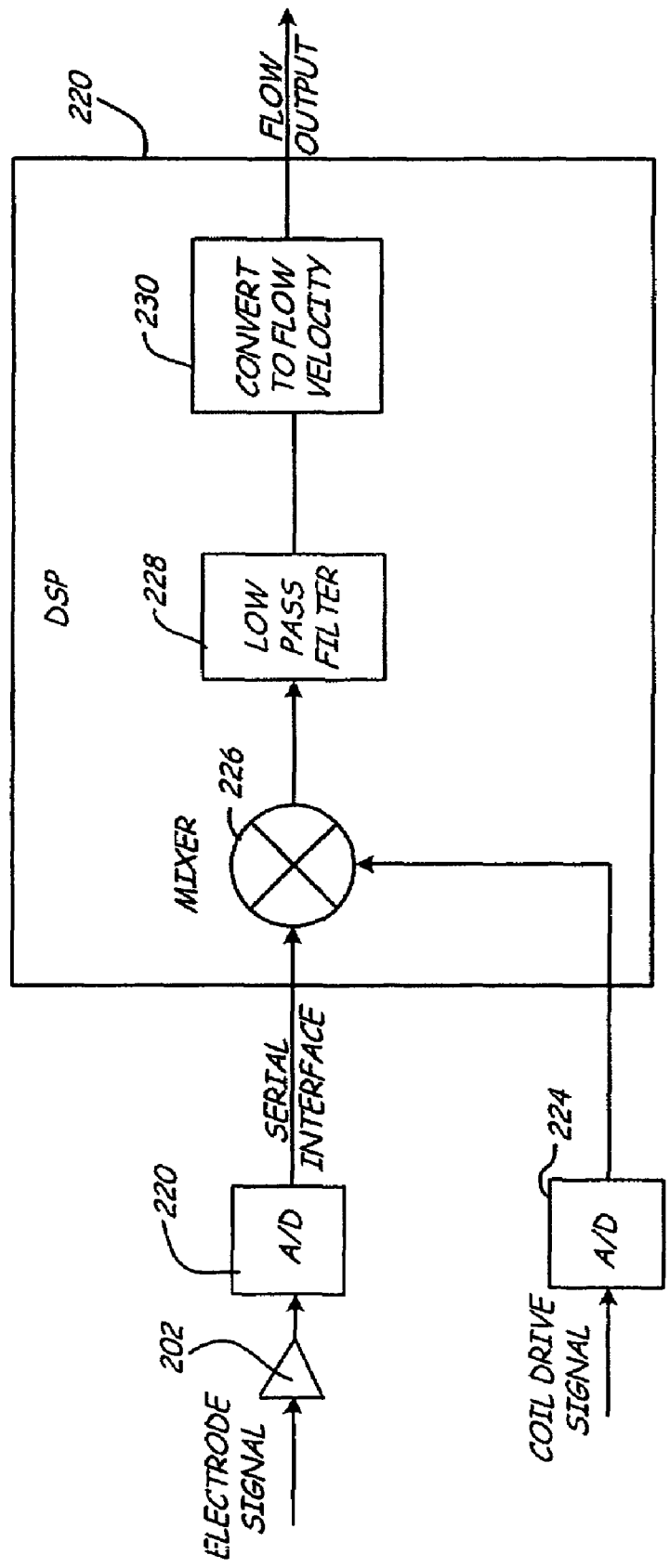
FIG. 6 is a amplified block diagram of a lock-in amplifier implemented in software.

FIG. 6 is a block diagram of a lock-in amplifier implemented in a digital signal processor to 220. This configuration, an analog to digital converter 222 provides a digitized signal to digital signal processor 220 along with a digitized signal of the coil drive signal from analog to digital converter 224. In the digital signal processor a mixer 226 is implemented along with a low pass filter 228 and circuitry 230 to convert the information to flow velocity. In such a configuration, it is relatively straightforward to mix only the trailing 20% of each half period of the coil frequency. This allows the circuitry to use calibration constants that are available for analog circuitry used with existing flow tubes. Transient effects, such as nulling spikes, eddy currents, etc, of the switching coil current can be ignored. The low pass filter 228 can be adjusted by the customer or through other means for a particular application based upon damping time constants to improve signal-to-noise ratio. In contrast, a hardware low pass filter typically has a fixed transfer function.

Figure 7:
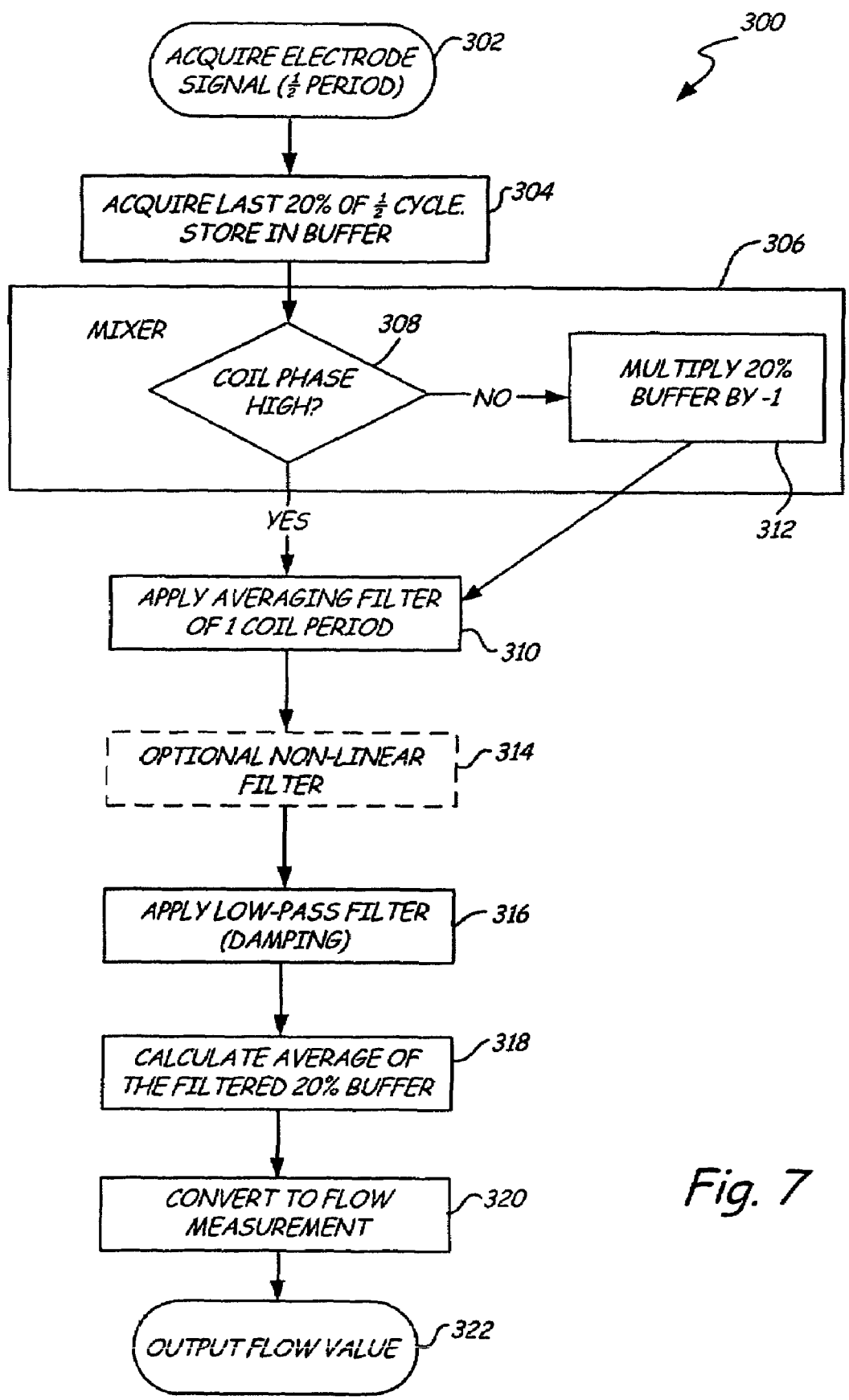
FIG. 7 is a flow chart showing steps implemented in software of the magnetic flow meter.

FIG. 7 is a simplified block diagram showing a flow chart 300 of software implementing the present invention. At block 302, a half period of the electrode signal is acquired and at block 304 the trailing 20% of the half cycle is stored in a memory buffer. Note that any portion of the waveform can be used and the invention is not limited to 20%. A software mixer 306 is implemented in software and includes checking if the coil phase is high in block 308. If the phase is high, control is passed to block 310. On the other hand, if the coil phase is not high, control is passed to block 312 where the buffered signal is inverted, control is then passed to block 310. At block 310, an averaging filter is applied over one coil period. Next, an optional non-linear filter at block 314 is applied to the signal. A low pass damping filter is applied at block 316 and control is passed to block 318 where the average of the filtered 20% buffer is determined. This data is then converted into a flow measurement using the techniques discussed above at block 320 and an output is provided at block 322.

Figure 8:
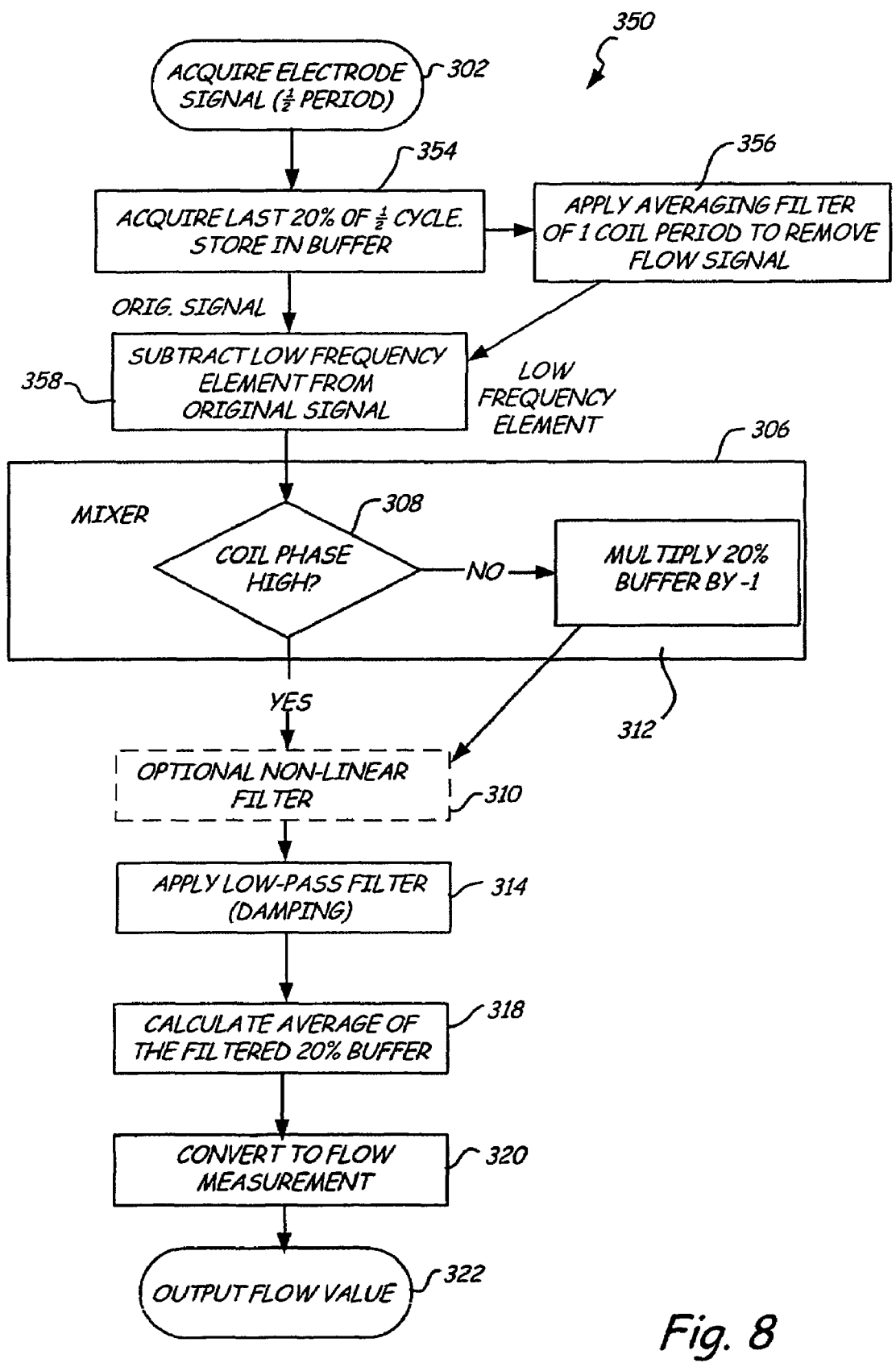
FIG. 8 is a flow chart similar to FIG. 7 which illustrates subtraction of low frequency components from an original voltage sensor signal to reduce noise.

FIG. 8 is a flow chart 350 of another example embodiment. Elements in FIG. 8 which are similar to elements in FIG. 7 have retained their numbering. In FIG. 8, some additional functionality is inserted after acquiring the half period of the electrode signal at block 302. Specifically, at block 354, after acquiring the trailing 20% of the half cycle and storing the information in a buffer, this information is provided to an averaging filter at block 356 which averages the data over one coil period to remove the flow signal. At block 358, this filtered signal is subtracted from the original signal to remove low frequency noise.

The software lock-in amplifier configuration discussed above provides a number of advantages in signal processing. The transfer function of the filter drops off relatively rapidly as the frequency moves away from the coil frequency. Preferably, in order to eliminate the 1/f noise, the coil frequency should be as high as possible. The configuration significantly reduces linear signals that are outside of the reference frequency. However, non-linear noise caused by, for example, an impingement of an electrode, can still cause large spikes in the flow data. In order to remove or reduce such spikes, a non-linear filter 310 can be implemented such as a median filter. For example, electrical noise caused by material hitting or debris rubbing against the electrodes of the flow tube can cause large spikes in the voltage difference between the electrodes. One technique to reduce this noise is to apply greater current to the coils to increase the signal-to-noise ratio. However, the flow spikes can still be significantly larger than the increased signal. Another technique which has been used to address such spikes is to increase the time constant of the damping filter. This does reduce the noise spikes somewhat, but also decreases the response time of the system and limits how effectively a control loop can respond to a process fluctuation. The median filter 310 can be inserted after the demodulation at block 306 and before the damping filter 314. In this example of a non-linear filter, the median filter sorts the incoming data within a fixed window size and uses the middle point or points. For example, a median filter of 150 milliseconds results in a delay of one half of the window size, or 75 milliseconds.

As used herein, the "non-linear filter" refers to any filter that is used to remove nonGaussian noise, typically in the form of outliers or impulse type noise signatures. Examples of non-linear filters include Recursive median filter, Weighted median filter, Center Weighted median filter, Permutation-Weighted median filter, Nonlinear Noise Reduction, and Locally Projective Noise Reduction. Further, the signal detection implemented in software of the present invention can be synchronized with the coil drive signal. For example, when using a mixer implemented in software, the mixer mixes the received electrode voltage signal along with the coil drive signal. Of course, the coil drive signal itself is not required and any signal which is synchronized to the drive signal can actuate the software.

While the present invention was describe in reference to preferred embodiments, workers skilled in the art will recognize that changes may be made in form and detail without departing from the spirit and scope of the invention.

What is claimed is:

1. A magnetic flowmeter for measuring flow of a process fluid, comprising:
    a coil configured to apply a magnetic field to the process fluid;
    a coil driver configured to apply a coil drive signal to the coil;
    electrodes arranged to sense a fluid voltage signal related to the applied magnetic field and fluid flow;
    an analog to digital converter having a digital output comprising a plurality of digital samples related to the sensed fluid voltage signal;
    digital computation circuitry configured to receive the digitized samples, filter the samples in accordance with a non-linear filter implemented in software, and responsively provide an output related to flow;
    wherein the digital computation circuitry inverts at least a portion of the digitized sensed fluid signal; and
    the portion comprises a trailing portion of a half cycle of the fluid voltage signal.

2. The apparatus of claim 1 wherein the computation circuitry comprises software implemented in a microprocessor system.

3. The apparatus of claim 1 wherein the non-linear filter comprises a median filter.

4. The apparatus of claim 1 wherein the portion comprises 20% of a half period of the fluid voltage.

5. The apparatus of claim 1 wherein the inverting is synchronized with the coil drive signal.

6. The apparatus of claim 1 wherein the computation circuitry calculates an average of a portion of the digital samples.

7. The apparatus of claim 6 wherein the average is taken over a period of the coil drive signal.

8. The apparatus of claim 1 including a low pass filter configured to filter the digital samples.

9. A magnetic flowmeter for measuring flow of a process fluid, comprising:
    a coil configured to apply a magnetic field to the process fluid;
    a coil driver configured to apply a coil drive signal to the coil;
    electrodes arranged to sense a fluid voltage signal related to the applied magnetic field and fluid flow;
    an analog to digital converter having a digital output comprising a plurality of digital samples related to the sensed fluid voltage signal;
    computation circuitry configured to receive the digitized samples and provide an output related to flow by inverting using software at least a portion of the digitized sensed fluid voltage signal; and
    the portion comprises a trailing portion of a half cycle of the fluid voltage signal.

10. The apparatus of claim 9 wherein the computation circuitry is configured to filter the samples in accordance with a non-linear filter.

11. The apparatus of claim 9 wherein the computation circuitry comprises software implemented in a microprocessor system.

12. The apparatus of claim 9 wherein the non-linear filter comprises a median filter.

13. The apparatus of claim 9 wherein the portion comprises 20% of a half period of the fluid flow signal.

14. The apparatus of claim 9 wherein the inverting is synchronized with the coil drive signal.

15. The apparatus of claim 9 wherein the computation circuitry calculates an average of a portion of the digital samples.

16. A method for measuring flow in a process fluid, comprising:
    applying a coil drive signal to a coil proximate the process fluid and thereby applying a magnetic field to the process fluid;
    sensing a fluid voltage signal in the process fluid related to the applied magnetic field and to fluid flow;
    digitizing samples of the voltage signal;
    digitally filtering samples of the digitized voltage signal using a non-linear filter implemented in software;
    including inverting at least a portion of the digitized sensed fluid flow signal;
    the portion comprising a trailing portion of a half cycle of the fluid voltage signal; and outputting flow based upon the filtered samples.

17. The method of claim 16 wherein the non-linear filter comprises a median filter.

* * * * *